United States Patent [19]

Brugman

[11] 4,160,344

[45] Jul. 10, 1979

[54] SUSPENSION DEVICE FOR A SUPPORT

[75] Inventor: Johannes A. H. Brugman, Rotterdam, Netherlands

[73] Assignee: Hunter Douglas International N.V., Curacao, Netherlands Antilles

[21] Appl. No.: 860,877

[22] Filed: Dec. 15, 1977

[51] Int. Cl.² ............................................... E04B 5/52
[52] U.S. Cl. ........................................ 52/39; 52/484; 248/295 C; 52/714
[58] Field of Search ............... 52/486, 39, 714, 484, 52/489; 248/295 C

[56] References Cited

U.S. PATENT DOCUMENTS

| 3,495,796 | 2/1970 | Fruh ..................................... 248/327 |
| 3,708,941 | 1/1973 | Cuckson ................................. 52/484 |
| 3,995,823 | 12/1976 | Hansel ............................... 52/484 X |

Primary Examiner—Price C. Faw, Jr.
Assistant Examiner—Carl D. Friedman
Attorney, Agent, or Firm—Pennie & Edmonds

[57] ABSTRACT

A suspension device for a support, in particular a support for a fixing panel, in which a body portion is formed as an integral structure and has two laterally extending diverging arms extending from junction points on the body portions. The body portion has downwardly extending feet, which extend at least up to the junction point of the lower of the clamping arms, and the arms are provided with axially aligned apertures to receive a support bar on the panels. Locking feet are provided at the lower ends of the legs to engage in an orifice in a support member.

9 Claims, 4 Drawing Figures

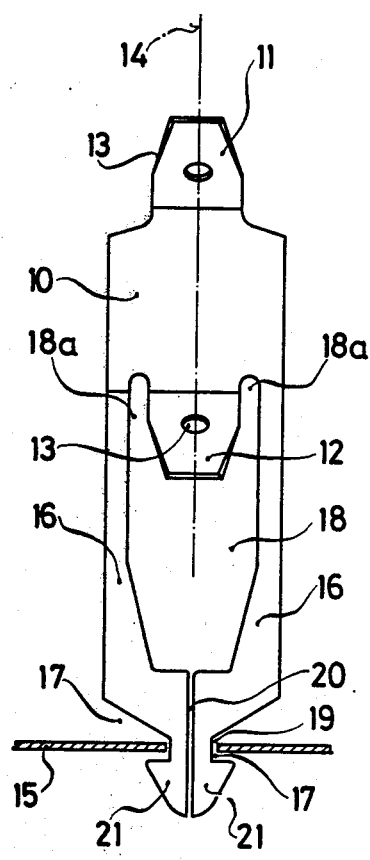
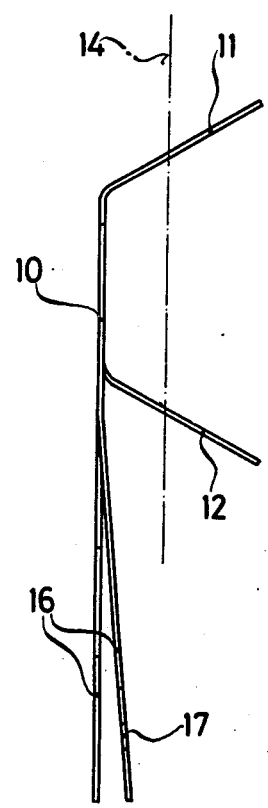

FIG. 3
FIG. 4
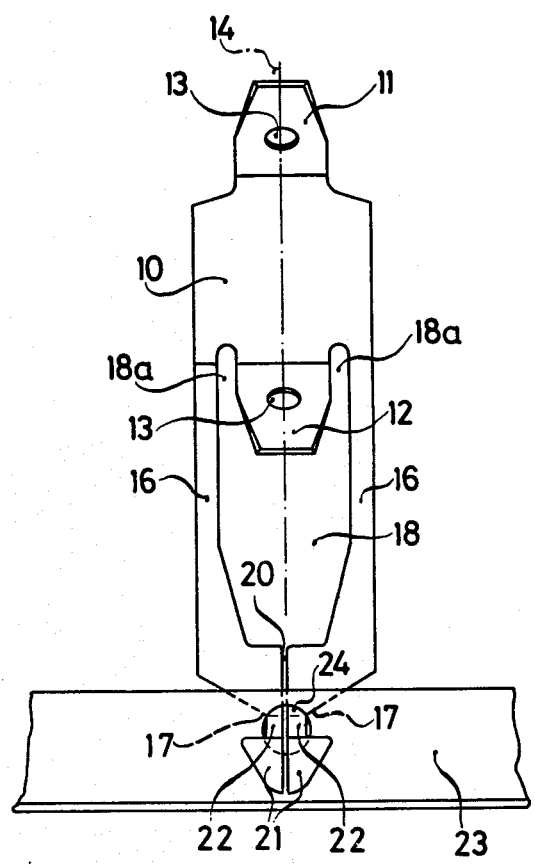
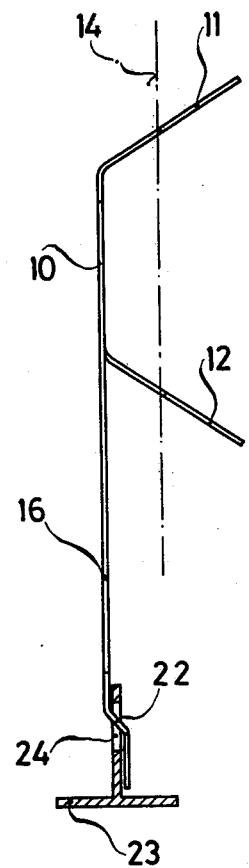

SUSPENSION DEVICE FOR A SUPPORT

The invention relates to a suspension device for a support, in particular a support used for fixing panels.

A known suspension device of this type comprises a mainly C-shaped or V-shaped clamping bracket which has laterally extending, diverging clamping arms of resilient material, each provided with an orifice for introducing a support bar, and a suspension element which is joined to the clamping bracket and which is sub-divided downwards into two resilient legs, the lower ends of which are designed to lock onto a support member.

In known devices of this type, one side of the clamping bracket is adjoined by a joint element which extends downwards and the lower end of which is adjoined by two legs which are separated by a slit for a part of their length. In a preferred embodiment of the known means, a relatively small notch is formed on each of the outsides of the ends of the legs. After the arms have been pressed together, the ends of the legs can be introduced into an orifice formed in the support member. When the legs are then released, they move apart due to their resilience, so that the rim of the orifice engages with the two notches. Thus, this provides a suspension device, with the aid of which the panel holding support is mounted on the support member.

It has been found to be a disadvantage of this embodiment that the two resilient legs are relatively short and are only spaced apart by a relatively small distance from one another. The pressing together of the arms therefore requires a relatively large force. Another disadvantage is that, due to the small distance of the legs from one another, only a small space can be provided in the form of a slot between these. If it is desired to produce the device by stamping, difficulties arise because of the small distance of the individual stamping edges from one another. There is a further difficulty in respect of the edges of the two notches. The small dimensions of the parts of material to be stamped in this zone frequently cause jamming and hence, in the long term, also damage to the stamping tools.

It is to be regarded as a further disadvantage that, if additional constructional elements are not desired, the axis in which the legs engage with the orifice of the support member and the device is joined to the support member, has a relatively small distance from the axis on which, in turn, the panel support bar is mounted on the clamping arms of the clamping bracket.

According to the present invention, we provide a suspension device for a support, in particular a support for fixing panels, such device comprising a body portion, an upper arm of resilient material projecting laterally from a junction point on said body portion; a lower clamping arm projecting laterally from a junction point on said body portion, said upper and lower arms diverging from one another, the arms having axially aligned orifices to receive a support bar, a pair of legs which extend downwardly from said body portion, the legs extending at least up to the junction point of said lower lateral arm, the legs each extending past one side of the lower arm and locking feet portions formed on the lower ends of said legs.

Such a device can be mounted quickly, readily and without errors and that the production thereof by stamping is simplified. This also includes avoiding damage to the stamping tools and hence an extension of the life thereof, as well as facilitating the release of the stamped means.

This design achieves the advantage that a substantially wider recess can be formed between the resilient legs. In this way a larger spacing between the stamping edges can be obtained. Another advantage of the invention is that the legs extend upwards at least up to the height of junction point of the lower clamping arm and are thus longer than in the known device. The result of this is that the legs can more readily be manipulated for locking the lower ends of the legs into an orifice of the support member.

In the following text, several advantageous embodiments of the invention are described, one of which comprises the formation, between the legs, of a recess, the width of which at least equals the width of the lower clamping arm. In the body of the device, a larger distance of the stamping edges results from this particularly large width of the recess. The available space for movement of the legs is also correspondingly large and, according to a further proposal of the invention, this can additionally also be achieved if the recess has parts which extend approximately alongside the lower clamping arm into the body of the device. In this way, a further extension of the two legs is effected at the same time.

Locking feet at the lower end of the legs can also be designed in a manner different from hitherto described.

If, however, in accordance with the last-mentioned embodiment, notches are provided on the outside of the legs and locking feet are provided at the ends of the legs, it is advantageous, according to the invention, if the total width of the two locking feet is less than the total width of the device. The device is thus given dimensions which ensure that jamming of the stamping tool by small parts of material to be stamped out need no longer be feared. Moreover, the stamped out portions can now more readily be released from the stamping tool.

According to a further proposal of the invention, the manipulation of the device is facilitated if the legs are arranged in planes differing from one another and at a slight inclination to one another. Since the legs are separated, at their lower ends below the recess, only by a parting line, so that the orifice to be provided in the support does not become excessively large and also that a firm seating of the locking feet is ensured, the movement of the legs towards one another, required before a compression of the latter, can be dispensed with. A small inclination of the two planes of the legs towards one another suffices to enable the legs to intersect or be superimposed when they are pressed together, without a risk of jamming or sticking. A corresponding result can also be obtained, inter alia, by an oblique position of one of the legs relative to the plane of the body portion.

The proposed device can, in an advantageous manner, be stamped integrally out of a suitable material, for example spring steel. The essential advantages of the invention is, however, still achievable if the body and arms are produced as a separate piece and only joined later to the remaining part of the device.

The locking feet can be used for engagement with a correspondingly sized orifice which is present either on the support itself or in a locking element joined thereto. If, however, the recess does not lie in an approximately horizontal plane, this can cause difficulties for the suspension. In a further development of the invention it is therefore proposed that the lower ends of the legs are provided with inclined portions and which pass through an orifice in part of the support member, and that the inclined portions have the locking feet therebelow, these locking feet engaging the back of the support member.

The angling of the inclined portion has the effect that a good suspension can be achieved even if the orifice does not extend in a horizontal plane but is present, for example, in a vertical part of the support or of a corresponding locking element. In a particularly simple manner it is possible to use, for example, a T-profile as the support, the orifice being formed in the upward-extending stem of the T. The device can still be used in an advantageous manner for orifices lying in a horizontal plane.

Moreover, it is proposed in this connection that the locking feet are each angled off downwards, relative to the inclined portions, into a plane which is approximately parallel to the associated leg. If the orifice is in a vertical part of the support, the result of this is that the locking feet which are angled off downwards bear against this part.

The inclination of an inclined portion, relative to the associated leg can be between 40° and 50°.

In order that the invention may more readily be understood, the following description is given of two preferred embodiments of device according to the invention, the description being given merely by way of example, reference being made to the accompanying drawings, in which:

FIG. 1 is a front elevation of a first of said preferred embodiments of device according to the invention, the device being shown mounted on a support;

FIG. 2 is a side elevation of the device of FIG. 1;

FIG. 3 is a view similar to FIG. 1 of a second preferred embodiment of device according to the invention, having inclined portions and an orifice in the vertical part of an inverted T-shaped support; and FIG. 4 is a side elevation of the device of FIG. 3.

The device illustrated in FIGS. 1 and 2 comprises a clamping bracket part including a body 10 and a pair of resilient material clamping arms 11, 12 which diverge with respect to one another and are provided with aligned orifices 13. The orifices are arranged to receive a support bar, which is here only indicated by an axis 14, the support bar being clamped by the spring action of the clamping arms 11 and 12 and their diverging arrangement.

A support member 15, of which only a horizontal part of the profile cross-section is shown here, is joined to the clamping bracket part by two resilient legs 16, each of which is provided in its lower zone with a notch 17 on the outer edge. The upper ends of the legs 16 are connected to the body 10 of the clamping bracket on each side thereof. Between the legs 16, a recess 18 is formed, the width of which is greater than the width of the lower clamping arm 12 so that the recess 18 has recess parts 18a which extend in the zone alongside the lower clamping arms 12.

The lower ends of the legs 16, including the notches 17 and the locking feet 21, which are defined by the notches, are a constituent of a locking device which also includes an orifice 19 formed in the support 15. As can be seen from FIG. 2, the two legs 16 are in two differing planes at a slight inclination to one another so that, when the resilient legs 16 are pressed together, the inner edges 20 thereof do not come into contact and the lower ends of the legs 16, provided with the notches 17 and the locking feet 21, can be superimposed or overlap. In this position, the parts of the legs 16, which lie below the notches 17, can be pushed through the orifice 19. As soon as the legs 16 are released, they reassume the position shown in FIG. 1, in which the rims of the orifice 19 engage in the notches 17. The support 15 is now suspended on the legs 16 of the device.

As can be seen in particular from FIG. 1, the device as a whole can very advantageously be stamped out of a single piece of suitable material, for example sheet metal or plastic, all the stamping edges still having an adequately large distance from one another. Since the total width of the device is now determined by the legs 16 adjoining the sides of the body 10, the total width of the locking feet 21 can be significantly smaller than the total width of the device. Thus, to produce the notches 17, a relatively large piece of material, which can readily be removed, can be stamped out without risk of damage to the stamping dies. Moreover, as a result of the proposed arrangement, the recess 18 is given such a size that the legs 16 can be manipulated very easily and with a relatively small force.

In the embodiment according to FIGS. 3 and 4, those parts of the device, which coincide with the corresponding parts of the embodiment according to FIGS. 1 and 2, are designated by the same reference numerals.

In the zone of the notches 17, the lower ends of the legs 16, are formed with inclined portions 22 which make the connection to the locking feet 21. As can be seen from FIG. 4, the inclined portions 22 are angled-off, relative to the legs 16, to one side at an angle of about 45°. The locking feet 21 adjoining the inclined portions 22 are angled-off downwards, in particular for such a distance that they run approximately parallel to the particular associated leg 16.

The support 23 used here is an inverted T-shaped profile in which a circular orifice 24 is present in its stem which extends upwards.

When the legs 16 are pressed over one another in differing planes so that the locking feet 21 can be superimposed or overlap, the latter can be pushed through the orifice 24. As soon as the arms 16 are released, they reassume their original position. As FIG. 4 shows, when the support 23 is suspended, the upper rim of the orifice 24 rests on the inclined portions 22 whilst the locking feet 21 bear against the vertical part of the support 23 and prevent the support from sliding down off the inclined portions 22.

I claim:

1. A suspension device for a support, having an opening, in particular a support for fixing panels, said device comprising, in combination:
    (a) a body portion;
    (b) an upper arm of resilient material projecting laterally from a junction point on said body portion;
    (c) a lower clamping arm projecting laterally from a junction point on said body portion, said upper and lower arms diverging from one another;
    (d) means defining an orifice in each of said arms, said orifices being axially aligned to receive a support bar;
    (e) a pair of legs which extend downwardly from said body portion and having lower free ends, the legs extending at least up to the junction point of said lower lateral arm, the legs extending past opposite sides of the lower arm;
    (f) locking feet portions formed on the lower ends of said legs;

(g) means defining an opening in the body between the legs for rendering said legs flexible, the width of the opening being at least equal to the width of the lower arm;
(h) said opening having portions which extend alongside the lower clamping arm at least up to the junction point of the latter with the body; and
(i) said locking feet portions being formed to engage in said opening in said support by snap-in action.

2. A device as claimed in claim 1, wherein said locking feet are defined by notches provided on the outside of the legs, the total width of the locking feet being less than the total width of the device.

3. A device as claimed in claim 1, wherein said legs are arranged in different planes from one another, and at a slight inclination to one another.

4. A clamping device as claimed in claim 1, and further comprising laterally inclined portions on said legs, at the lower ends thereof, above said locking feet.

5. A clamping device as claimed in claim 4, wherein the locking feet are each angled off relative to the inclined portions, into a plane which is approximately parallel to the associated legs.

6. A device as claimed in claim 5, wherein the inclination of the inclined portions relative to the associated leg is between 40° and 50°.

7. A suspension device for a support, in particular a support for fixing panels, said device comprising, as an integral structure, in combination:
(a) a body portion;
(b) an upper clamping arm of resilient material projecting laterally from a junction point on said body portion;
(c) a lower clamping arm of resilient material projecting laterally from a junction point on said body portion, said lower arm diverging from said upper arm;
(d) means defining an orifice in each of said clamping arms, said orifices being axially aligned to receive a support bar;
(e) a pair of legs extending downwardly from body portion and extending at least up to the junction point of said lower clamping arm, said legs each extending past one side of the lower clamping arm;
(f) means defining a recess in said body portion, the width of said recess being at least equal to the width of the lower clamping arm;
(g) means defining notches on the outside of the arm, said notches forming locking feet at the ends of the legs, the total width of the two locking feet being less than the total width of the device, and
(h) laterally inclined portions on said legs, at the lower ends thereof, above said locking feet, the locking feet each being angled off relative to the inclined portions, into a plane which is approximately parallel to the associated legs.

8. A suspension device for a support, in particular a support for fixing panels, said device comprising, in combination:
(a) a body portion;
(b) an upper arm of resilient material projecting laterally from a junction point on said body portion;
(c) a lower clamping arm projecting laterally from a junction point on said body portion, said upper and lower arms diverging from one another;
(d) means defining an orifice in each of said arms, said orifices being axially aligned to receive a support bar;
(e) a pair of legs which extend downwardly from said body portion and having lower free ends, the legs extending at least up to the junction point of said lower lateral arm, the legs each extending past one side of the lower arm;
(f) locking feet portions formed on the lower ends of said legs;
(g) laterally inclined portions on said legs at the lower ends thereof and above said locking feet; and
(h) said locking feet being angled off relative to the inclined portions into planes which are approximately parallel to the associated legs.

9. A device as claimed in claim 8, wherein the inclination of the inclined portions relative to the associated leg is between 40° and 50°.

* * * * *

UNITED STATES PATENT AND TRADEMARK OFFICE
CERTIFICATE OF CORRECTION

PATENT NO. : 4,160,344
DATED : July 10, 1979
INVENTOR(S) : Johannes A.H. Brugman It is certified that error appears in the above-identified patent and that said Letters Patent are hereby corrected as shown below:

Priority of West German Application 27 00 002 filed January 3, 1977.

Signed and Sealed this

Thirteenth Day of May 1980

[SEAL]

Attest:

SIDNEY A. DIAMOND

Attesting Officer       Commissioner of Patents and Trademarks